(12) United States Patent
Xiong et al.

(10) Patent No.: US 12,501,493 B2
(45) Date of Patent: Dec. 16, 2025

(54) METHOD AND DEVICE FOR DETERMINING CONFIGURATION

(71) Applicant: Samsung Electronics Co., Ltd., Suwon-si (KR)

(72) Inventors: Qi Xiong, Beijing (CN); Yi Wang, Beijing (CN); Feifei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 17/917,807

(22) PCT Filed: Apr. 8, 2021

(86) PCT No.: PCT/KR2021/004420
§ 371 (c)(1),
(2) Date: Oct. 7, 2022

(87) PCT Pub. No.: WO2021/206473
PCT Pub. Date: Oct. 14, 2021

(65) Prior Publication Data
US 2023/0132942 A1 May 4, 2023

(30) Foreign Application Priority Data

Apr. 9, 2020 (CN) .......................... 202010274619.7
Jul. 17, 2020 (CN) .......................... 202010693980.3

(51) Int. Cl.
*H04W 74/0833* (2024.01)
*H04L 27/26* (2006.01)
(Continued)

(52) U.S. Cl.
CPC ... *H04W 74/0841* (2013.01); *H04L 27/26025* (2021.01); *H04W 72/1268* (2013.01);
(Continued)

(58) Field of Classification Search
CPC ......... H04W 74/0841; H04W 72/1268; H04W 74/006; H04L 27/26025
See application file for complete search history.

(56) References Cited

U.S. PATENT DOCUMENTS

2017/0019930 A1 1/2017 Lee et al.
2018/0110074 A1 4/2018 Akkarakaran et al.
(Continued)

FOREIGN PATENT DOCUMENTS

CN 109863814 A 6/2019
CN 110169189 A 8/2019
(Continued)

OTHER PUBLICATIONS

OPPO, Discussion on the remaining issues of initial access signal/channel, R1-2000467, 3GPP TSG RAN WG1 #100-E, e-Meeting, Feb. 15, 2020, Athens, Greece.
(Continued)

*Primary Examiner* — Jael M Ulysse
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides a method and device for determining a configuration.

15 Claims, 11 Drawing Sheets

(51) Int. Cl.
*H04W 72/1268* (2023.01)
*H04W 74/00* (2009.01)
*H04W 74/0836* (2024.01)

(52) U.S. Cl.
CPC ..... *H04W 74/006* (2013.01); *H04W 74/0836* (2024.01); *H04W 74/0833* (2013.01)

(56) References Cited

U.S. PATENT DOCUMENTS

| | | | |
|---|---|---|---|
| 2019/0215888 A1* | 7/2019 | Cirik | H04W 72/0446 |
| 2019/0223224 A1* | 7/2019 | Park | H04W 74/0833 |
| 2019/0342874 A1* | 11/2019 | Davydov | H04W 72/23 |
| 2019/0380071 A1 | 12/2019 | Liu | |
| 2020/0008240 A1 | 1/2020 | Golitschek Edler Von Elbwart et al. | |
| 2020/0100299 A1 | 3/2020 | Loehr et al. | |
| 2020/0146054 A1* | 5/2020 | Jeon | H04W 74/006 |
| 2020/0221504 A1* | 7/2020 | Cirik | H04L 1/1864 |
| 2020/0221506 A1* | 7/2020 | Jeon | H04W 74/0833 |
| 2020/0367288 A1* | 11/2020 | Dahlman | H04W 74/0833 |
| 2020/0396744 A1* | 12/2020 | Xiong | H04L 27/2636 |
| 2020/0404713 A1* | 12/2020 | Sakhnini | H04W 74/0833 |
| 2021/0153260 A1 | 5/2021 | Ma et al. | |
| 2021/0345407 A1 | 11/2021 | Myung et al. | |
| 2022/0191941 A1* | 6/2022 | Lee | H04W 72/23 |
| 2022/0225428 A1* | 7/2022 | Xiong | H04W 72/044 |
| 2022/0287080 A1 | 9/2022 | Liu | |
| 2024/0049287 A1* | 2/2024 | Lee | H04W 74/0833 |

FOREIGN PATENT DOCUMENTS

| | | |
|---|---|---|
| CN | 110366868 A | 10/2019 |
| CN | 110771248 A | 2/2020 |
| CN | 110784934 A | 2/2020 |
| WO | 2020/032703 A1 | 2/2020 |
| WO | 2020/060466 A1 | 3/2020 |
| WO | 2020/069209 A1 | 4/2020 |

OTHER PUBLICATIONS

VIVO, Remaining issues on channel structure for 2-step RACH, R1-2000304, 3GPP TSG RAN WG1 #100-E, e-Meeting, Feb. 14, 2020.

Huawei et al., Corrections on channel structure of 2-step RACH, R1-2001029, 3GPP TSG RAN WG1 Meeting #100-e, e-Meeting, Feb. 15, 2020.

Intel Corporation, Remaining details of channel structure for 2-step RACH, R1-2000719, 3GPP TSG RAN WG1 #100-E, e-Meeting, Feb. 15, 2020.

Nokia et al., Discussion on Two-step RACH LS received from RAN2, R1-2001958, 3GPP TSG RAN WG1 Meeting #100-Bis-e, e-Meeting, Apr. 8, 2020.

Samsung, Corrections on two-step RACH, RP-200184, 3GPP Draft, Mar. 11, 2020.

Extended European Search Report dated Jul. 4, 2023, issued in European Patent Application No. 21784763.1.

OPPO, Considering msgB reception window in NR/NR-U, R2-1905597, 3GPP TSG-RAN WG2 Meeting #106, May 2, 2019.

RAN2, LS to RAN1 on the starting point of MSGB window, R2-2002200, 3GPP TSG-RAN WG2 Meeting #109-e, Mar. 11, 2020.

Samsung, Handling Preambles not associated with PRUs, R2-2000225, 3GPP TSG-RAN WG2 Meeting#109, Feb. 13, 2020.

Moderator (ZTE), Summary of the discussion on the reply LS for MsgB window, R1-2002814, 3GPP TSG RAN WG1 Meeting #100bis-e, Apr. 25, 2020.

Chinese Office Action dated Sep. 27, 2024, issued in Chinese Patent Application No. 202010693980.3.

Spreadtrum Communications, Considerations on the random access procedure on 2-step, R1-1904779, 3GPP TSG RAN WG1 Meeting #96Bis, Xi'an, China, Mar. 29, 2019.

Di Junjie, Research on Massive MIMO Random Access Mechanism for Massive Users, Excellent Master's Degree Thesis Full Text Library, Jan. 15, 2020.

Fangfang Sun, Research on Overload Control Algorithm for LTE Random Access Channel, Excellent Master's Degree Thesis Full Text Library, Jan. 10, 2011.

Kaouther Taleb Ali; Sonia Ben Rejeb; Zied Choukair, Energy Conservation Strategy for M2M Differentiated Services in 5G/HetNet, 2018 6th International Conference on Multimedia Computing and Systems (ICMCS), Nov. 8, 2018.

Chinese Office Action dated Apr. 19, 2024, issued in Chinese Patent Application No. Application No. 202010693980.3.

* cited by examiner

METHOD AND DEVICE FOR DETERMINING CONFIGURATION

TECHNICAL FIELD

The application relates to the field of wireless communication, and more particularly, to a method and device for determining a configuration.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

Aspects of the disclosure are to solve at least the above problems and/or disadvantages, and provide at least the following advantages. Therefore, aspects of the disclosure provide a method and device for determining a configuration.

Solution to Problem

According to an aspect of the disclosure, a method for random access of a user equipment (UE) includes: obtaining a valid random access resource and a valid data resource based on configuration information; transmitting a message used for random access with the valid random access resources and data resources; and detecting a feedback in a random access response window determined according to a transmission of the message used for random access, where the message used for random access includes a random access signal and a data portion signal.

According to an aspect of the disclosure, obtaining the valid random access resource and the valid data resource based on the configuration information includes: determining random access resources and data resources configured for random access based on the configuration information; performing validation detection for the determined random access resources and data resources to obtain the valid random access resource and the valid data resource; mapping the valid random access resource and the valid data resource within a period; and obtaining a valid physical uplink shared channel (PUSCH) resource based on a result of the mapping.

According to an aspect of the disclosure, further including performing, for a OFDM symbol or a symbol group occupied by the valid PUSCH time-frequency resource, and/or Ngap OFDM symbols or a symbol group before the valid PUSCH time-frequency resource, at least one of the following: not receiving, by the UE, a physical downlink control channel (PDCCH), a physical downlink shared channel (PDSCH), or a channel state information reference signal (CSI-RS) on a slot where the symbol or the symbol group is located; not expecting, by the UE, a received time division uplink and downlink common configuration or time division uplink and downlink separate configuration to configure the symbol or the symbol group to be downlink and/or flexible; and not expecting, by the UE, a value of a slot format indication index carried by a received downlink control information format 2_0 to indicate that the symbol or the symbol group is downlink and/or flexible, where the Ngap is a predefined number of symbols.

According to an aspect of the disclosure, further including, in a case where there is a transmission of an additional uplink signal when an uplink signal related to the message used for random access is transmitted, if the uplink signal related to the message used for random access and the additional uplink signal satisfy a predetermined overlapping condition, performing at least one of: transmitting the uplink signal related to the message used for random access; transmitting the additional uplink signal; transmitting a signal which occurs first; and selecting, according to UE implementation, one of the uplink signal related to the message used for random access and the additional uplink signal for transmission.

According to an aspect of the disclosure, the uplink signal related to the message used for random access includes at least one of: the message used for random access; a random access signal of the message used for random access; a data portion signal of the message used for random access; and Message 1 for four-step random access.

According to an aspect of the disclosure, the additional uplink signal include at least one of: an uplink control channel (PUCCH) signal; an uplink shared channel (PUSCH) signal; a sounding reference signal (SRS); and an uplink signal with a timing advance adjusting value different from that of the signal related to the message used for random access.

According to an aspect of the disclosure, the predetermined overlapping condition includes at least one of: transmission occasions for the signal related to the message used for random access and the additional uplink signal partially overlapping or completely overlapping in time and/or frequency domain; the signal related to the message used for random access and the additional uplink signal being in the same slot; and the signal related to the message used for random access and the additional uplink signal being not in the same slot, but an interval between a last OFDM symbol of one of the signal and the additional uplink signal in a previous slot and the first OFDM symbol of the other one of the signal and the additional uplink signal in a latter slot being less than and/or equal to a threshold value, where the slot is determined by the signal related to the message used for random access and the additional uplink signal, or determined by a subcarrier spacing of a bandwidth part (BWP), and where the specific threshold value is configured or predefined by a network.

According to an aspect of the disclosure, further including: if the signal related to the message used for random access is not transmitted and is the random access signal of the message used for random access, the corresponding data portion signal of the message used for random access is also not transmitted.

According to an aspect of the disclosure, further including: the random access signal of the message used for random access and the data portion signal of the message used for random access being given different priorities.

According to an aspect of the disclosure, determining the random access response window according to the transmission of the message used for random access includes the following:

If a random access signal of the message used for random access and a data portion signal of the message used for random access are transmitted, or only the random access signal of the message used for random access is transmitted but there is a valid PUSCH time-frequency resource for the data portion signal of the message used for random access, the random access response window starts at the first OFDM symbol of the earliest control resource set in a Type1 downlink control channel common search space set configured to the UE, the earliest control resource set being one OFDM symbol after the end position of corresponding PUSCH time-frequency resource units; and if only the random access signal of the message used for random access is transmitted and there is no valid PUSCH time-frequency resource for the data portion signal of the message used for random access, the random access response window starts at the first OFDM symbol of the earliest control resource set in a Type1 downlink control channel common search space set configured to the UE, the earliest control resource set being at least one OFDM symbol after the end position of corresponding PRACH time-frequency resources, where a length of the OFDM symbol is determined by a subcarrier spacing for the Type1 downlink control channel common search space set.

According to an aspect of the disclosure, a length of the random access response window is a number of slots multiplied by a length of a slot, where the length of the slot is determined by the subcarrier spacing for the Type1 downlink control channel common search space set, and where the number of slots is indicated by a configured feedback window of a feedback message.

According to an aspect of the disclosure, only the random access signal of the message used for random access being transmitted but there being a valid PUSCH time-frequency resource for the data portion signal of the message used for random access further includes not the data portion signal of the message used for random access due to at least one of: power allocation for PUSCH/PUCCH/PRACH/SRS transmission; power allocation in a double chain (DC); a fact that the UE does not detect a downlink control information format 2_0 that provides a slot format; a fact that although the UE detects the downlink control information format 2_0 that provides a slot format but the detected slot format indicates that a symbol occupied by a PUSCH is flexible or downlink; an operation for determining a slot format; and overlapping with an uplink signal with a higher priority.

According to an aspect of the disclosure, a user equipment (UE) for random access includes: a transceiver receiving signals from a base station and transmitting signals to the base station; a memory storing executable instructions; and a processor executing the stored instructions to perform the aforementioned methods.

Advantageous Effects of Invention

According to aspects of the disclosure, it is possible for a user equipment (UE) to determine different random access response (RAR) windows for different transmissions of a message used for random access.

BRIEF DESCRIPTION OF DRAWINGS

Through the following description of the embodiments of the disclosure with reference to the accompanying drawings, the above and other purposes, features, and advantages of the disclosure will be more apparent. In the accompanying drawings.

MODE FOR THE INVENTION

Figure 1:
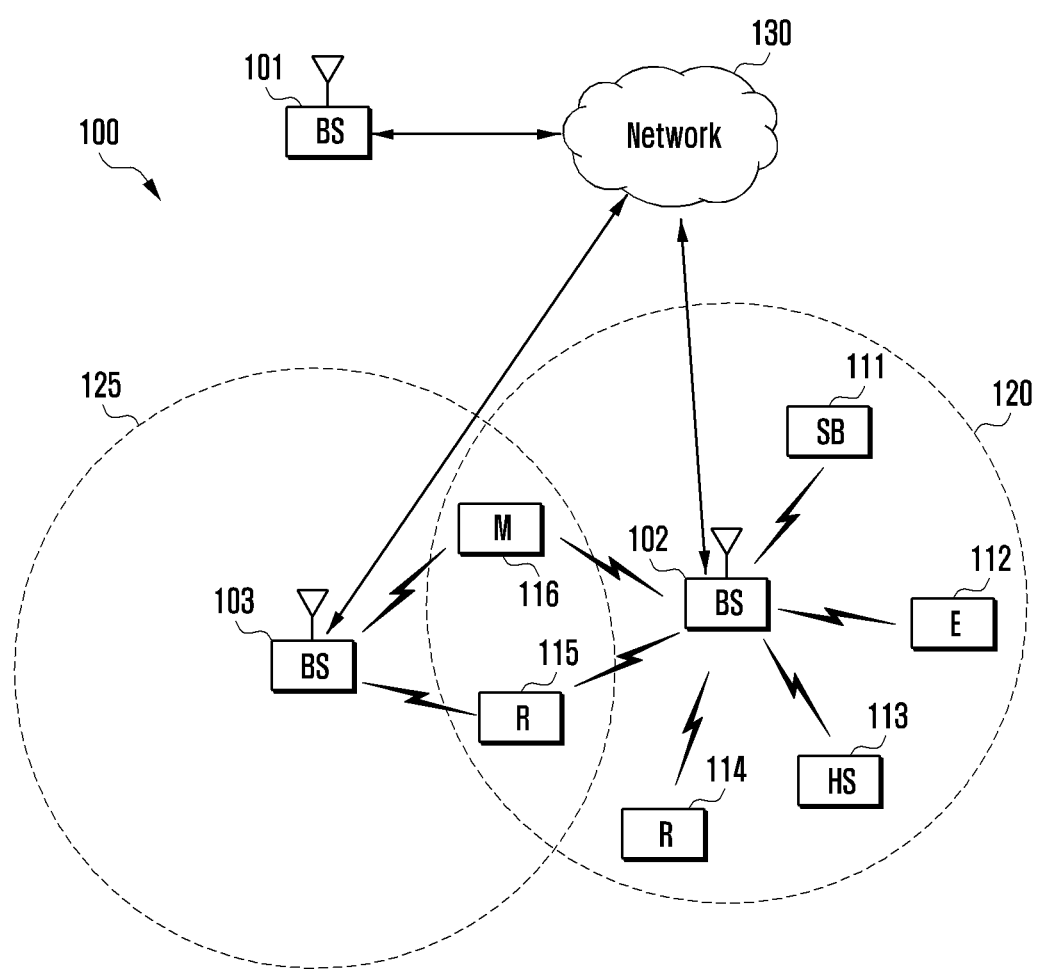
FIG. 1 illustrates an example wireless network 100 according to various embodiments of the disclosure.

Text and drawings are provided as examples only to help readers understand the disclosure. They are not intended and should not be interpreted as limiting the scope of the disclosure in any way. Although certain embodiments and examples have been provided, based on the disclosure herein, it will be apparent to those skilled in the art that changes may be made to the illustrated embodiments and examples without departing from the scope of the disclosure.

It can be understood by those skilled in the art that, the singular forms "a", "an", "said" and "the" used herein may also include plural forms unless expressly stated. It should be further understood that the wording "comprise" used in the specification of the disclosure means the presence of stated features, integers, steps, operations, elements and/or components, but does not exclude the presence or addition of one or more other features, integers, steps, operations, elements, components and/or groups thereof. It should be understood that when an element is referred to as being "connected" or "coupled" to another element, it may be directly connected or coupled to other elements, or there may be intermediate elements. In addition, "connect" or "couple" as used herein may include wireless connection or wireless coupling. As used herein, the phrase "and/or" includes all or any unit and all combinations of one or more associated listed items.

It can be understood by those skilled in the art that unless otherwise defined, all terms, including technical terms and scientific terms, used herein have the same meanings as generally understood by those of ordinary skill in the art to which the disclosure belongs. It should also be understood that terms such as those defined in a general dictionary should be understood to have meanings consistent with those in the context of the prior art, and will not be interpreted in idealized or overly formal meanings unless specifically defined herein.

It can be understood by those skilled in the art that "terminal" and "terminal device" used herein include not only devices with a wireless signal receiver which has no transmitting capability, but also devices with a receiving and transmitting hardware which can perform bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a PDA (Personal Digital Assistant), which may include a radio frequency receiver, a pager, an internet/intranet access, a web browser, a notepad, a calendar and/or a Global Positioning System (GPS) receiver; a conventional laptop and/or palmtop computer or other devices having and/or including a radio frequency receiver. As used herein, "terminal" and "terminal device" may be portable, transportable, installed in vehicles (aviation, sea transportation and/or land), or suitable and/or configured to operate locally, and/or in distributed form, operate on the earth and/or any other position in space. As used herein, "terminal" and "terminal device" may also be a communication terminal, an internet terminal, a music/video playing terminal, such as a PDA, a Mobile Internet Device (MID) and/or a mobile phone with music/video playing functions, a smart TV, a set-top box and other devices.

It can be understood by those skilled in the art that "base station" (BS) or "network device" as used herein may refer to an eNB, an eNodeB, a NodeB or a base station transceiver (BTS) or a gNB, etc., according to the technology and terminology used.

It can be understood by those skilled in the art that "memory" as used herein can be any type suitable for the technical environment herein, and can be implemented using any suitable data storage technology, including but not limited to a semiconductor-based memory device, a magnetic memory device and system, an optical memory device and system, a fixed memory and a movable memory.

It can be understood by those skilled in the art that "processor" as used herein can be any type suitable for the technical environment herein, including but not limited to one or more of: a general purpose computer, a special purpose computer, a microprocessor, a digital signal processor (DSP) and a processor based on a multi-core processor architecture.

A time domain unit (also called a time unit) in this disclosure can be: an OFDM symbol, an OFDM symbol group (composed of multiple OFDM symbols), a slot, a slot group (composed of multiple slots), a subframe, a subframe group (composed of multiple subframes), a system frame, and a system frame group (composed of multiple system frames); it can also be an absolute time unit, such as 1 millisecond, 1 second, etc.; the time unit can also be a combination of multiple granularities, such as N1 slots plus N2 OFDM symbols.

A frequency domain unit in this disclosure can be: a subcarrier, a subcarrier group (composed of multiple subcarriers), a resource block (RB) (also called a physical resource block (PRB)), a resource block group (composed of multiple RB), a bandwidth part (BWP), a bandwidth part group (composed of multiple BWPs), a band/carrier, and a band group/carrier group; it can also be an absolute frequency domain unit, such as 1 Hz, 1 kHz, etc.; the frequency domain unit can also be a combination of multiple granularities, such as M1 PRBs plus M2 subcarriers.

Embodiments according to the disclosure will be described in detail below with reference to the accompanying drawings.

FIG. 1 illustrates an example wireless network according to various embodiments of the disclosure. The embodiment of the wireless network shown in FIG. 1 is for illustration only. Other embodiments of the wireless network 100 can be used without departing from the scope of this disclosure.

The wireless network includes a gNodeB (gNB) 101, a gNB 102, and a gNB 103. The gNB 101 communicates with the gNB 102 and the gNB 103. The gNB 101 also communicates with at least one Internet Protocol (IP) 130, such as the Internet, a proprietary IP network, or other data network.

Depending on the network type, other well-known terms such as "base station" or "access point" can be used instead of "gNodeB" or "gNB." For the sake of convenience, the terms "gNodeB" and "gNB" are used in this patent document to refer to network infrastructure components that provide wireless access to remote terminals. Also, depending on the network type, other well-known terms such as "mobile station," "subscriber station," "remote terminal," "wireless terminal," or "user device" can be used instead of the term "user equipment" or "UE". For the sake of convenience, the terms "user equipment" and "UE" are used in this patent document to refer to remote wireless device that wirelessly accesses a gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, WiFi, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As will be described in more detail below, one or more of the gNB 101, the gNB 102, and the gNB 103 includes a 2D antenna array as described in embodiments of the disclosure. In some embodiments, one or more of gNB 101, gNB 102, and gNB 103 supports codebook design and structure for a system with a 2D antenna array.

Although FIG. 1 illustrates one example of a wireless network, various changes may be made to FIG. 1. For example, the wireless network can include any number of gNBs and any number of UEs in any suitable arrangement. Also, the gNB 101 can communicate directly with any number of UEs and provide those UEs with wireless broadband access to the network 130. Similarly, each of the gNBs 102-103 can communicate directly with the network 130 and provide UEs with direct wireless broadband access to the network 130. Further, the gNBs 101, 102, and/or 103 can provide access to other or additional external networks, such as external telephone networks or other types of data networks.

Figure 2A:
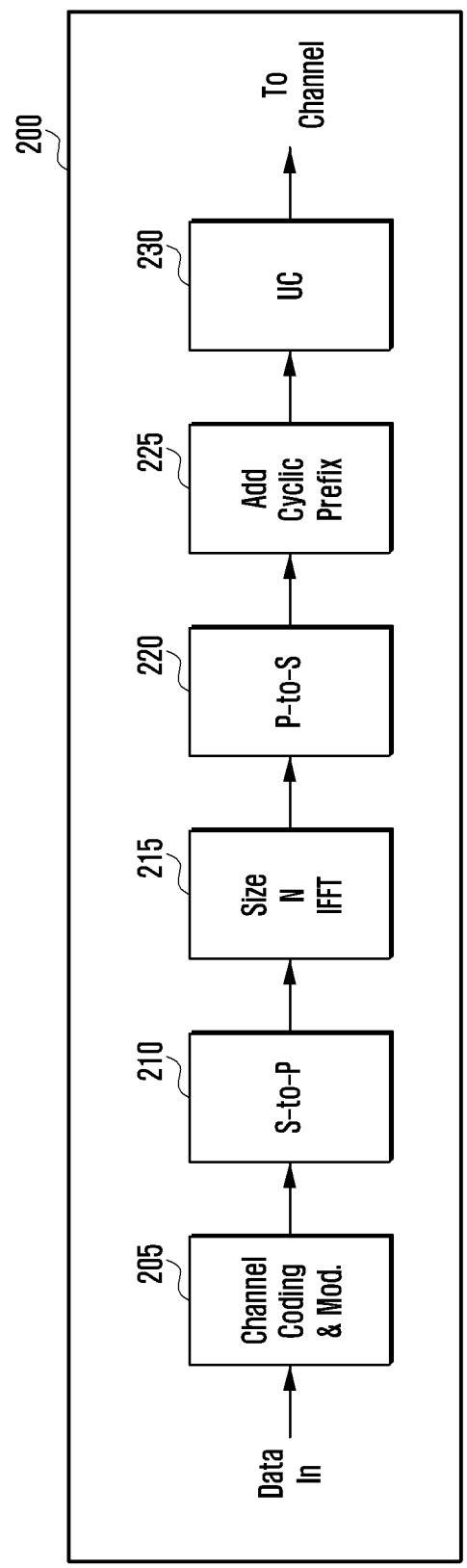
FIG. 2a illustrates an example wireless transmit path according to the disclosure.
Figure 2B:
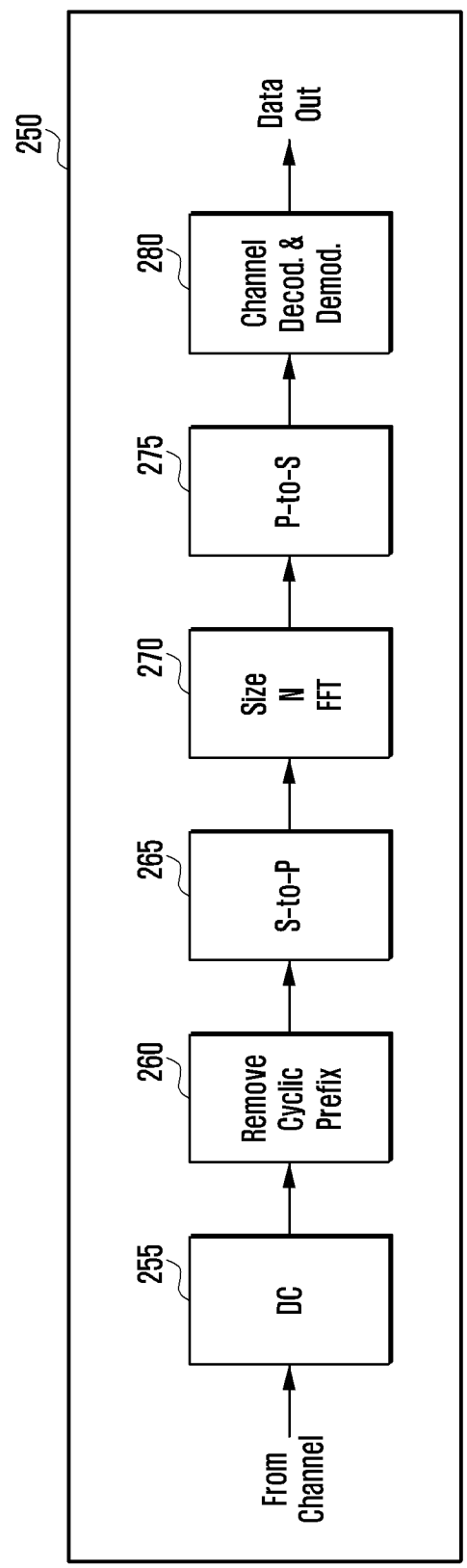
FIG. 2b illustrates an example wireless receive path according to the disclosure.

FIG. 2a illustrates an example wireless transmit path according to the disclosure, and FIG. 2b illustrates an example wireless receive path according to the disclosure. In the following description, a transmit path 200 can be described as being implemented in a gNB, such as the gNB 102, and a receive path 250 can be described as being implemented in a UE, such as the UE 116. However, it should be understood that the receive path 250 can be implemented in a gNB and the transmit path 200 can be implemented in a UE. In some embodiments, the receive path 250 is configured to support codebook design and structure for a system with a 2D antenna array as described in embodiments of the disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path circuitry 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding) and modulates the input bits (such as with Quadrature Phase Shift Keying (QPSK) or Quadrature Amplitude Modulation (QAM)) to generate a sequence of frequency domain modulation symbols. The serial-to-parallel block 210 converts (i.e., de-multiplexes) the serial modulated symbols to parallel data to generate N parallel symbol streams where N is the IFFT/FFT size used in the gNB 102 and the UE 116. The size N IFFT block 215 performs an IFFT operation on the N parallel symbol streams to generate time domain output signals. The parallel-to-serial block 220 converts (such as multiplexes) the parallel time domain output symbols from the size N IFFT block 215 to generate a serial time domain signal. The add cyclic prefix block 225 inserts a cyclic prefix to the time domain signal. The up-converter 230 modulates (such as up-converts) the output of the add cyclic prefix block 225 to RF frequency for transmission via a wireless channel. The signal may also be filtered at baseband before conversion to RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time domain baseband signal. The serial-to-parallel block 265 converts the time domain baseband signal to parallel time domain signals. The size N FFT block 270 performs an FFT algorithm to generate N parallel frequency domain signals. The parallel-to-serial block 275 converts the parallel frequency domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2a and 2b can be implemented using only hardware or using a combination of hardware and software/firmware. As a particular example, at least some of the components in FIGS. 2a and 2b may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of 2 (such as 1, 2, 4, 8, 16, or the like) for FFT and IFFT functions.

Although FIGS. 2a and 2b illustrate examples of wireless transmit and receive paths, various changes may be made to FIGS. 2a and 2b. For example, various components in FIGS. 2a and 2b can be combined, further subdivided, or omitted and additional components can be added according to particular needs. Also, FIGS. 2a and 2b are meant to illustrate examples of the types of transmit and receive paths that can be used in a wireless network. Any other suitable architectures can be used to support wireless communications in a wireless network.

Figure 3A:
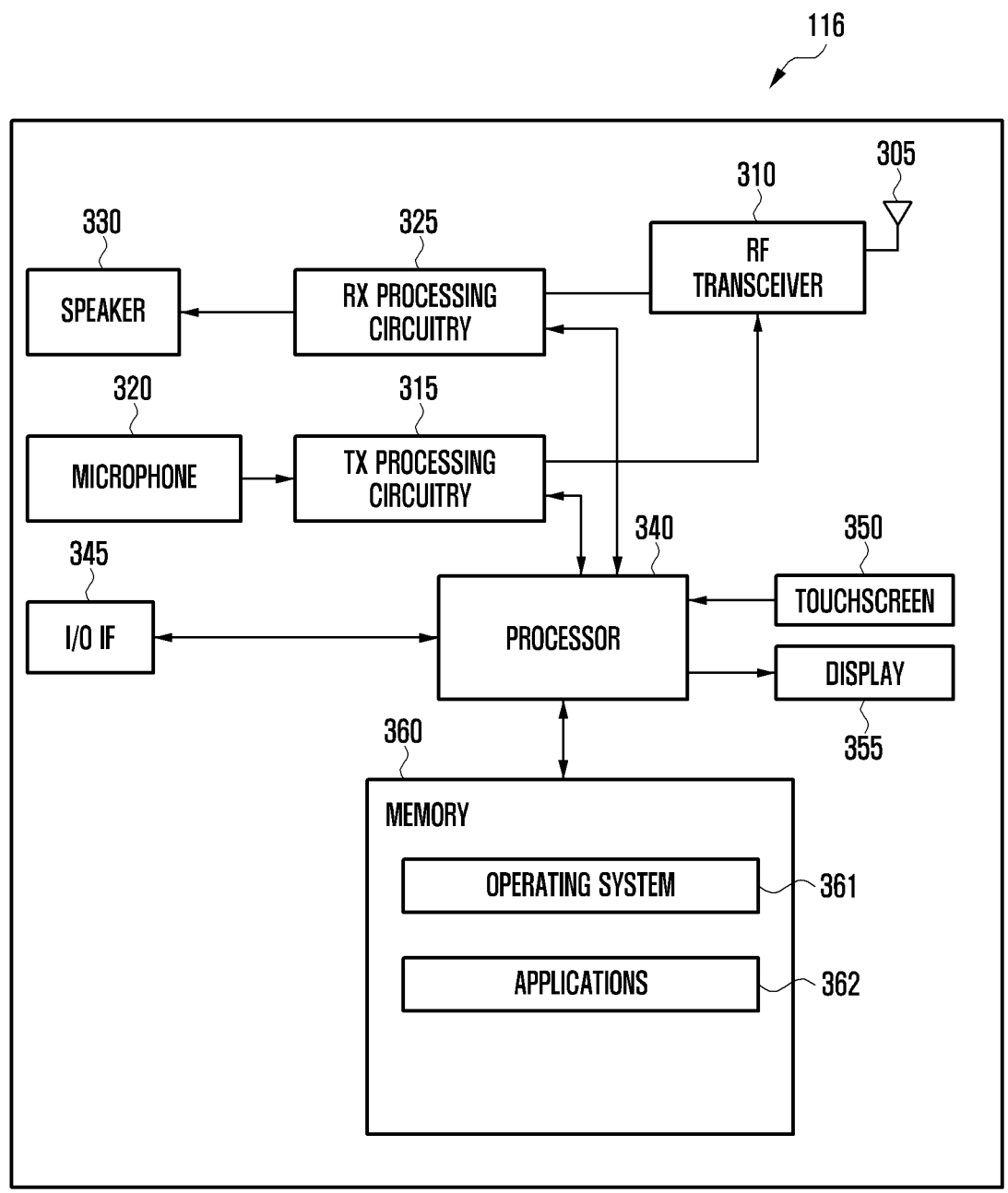
FIG. 3a illustrates an example UE 116 according to the disclosure.

FIG. 3a illustrates an example UE 116 according to the disclosure. The embodiment of the UE 116 illustrated in FIG. 3a is for illustration only, and the UEs 111-115 of FIG. 3a can have the same or similar configuration. However, UEs come in a wide variety of configurations, and FIG. 3a does not limit the scope of this disclosure to any particular implementation of a UE.

The UE 116 includes an antenna 305, a radio frequency (RF) transceiver 310, transmit (TX) processing circuitry 315, a microphone 320, and a receive (RX) processing circuitry 325. The UE 116 also includes a speaker 330, a processor/controller 340, an input/output (I/O) interface (IF) 345, an input device 350, a display 355, and a memory 360. The memory 360 includes a basic operating system (OS) program 361 and one or more applications 362.

The RF transceiver 310 receives, from the antenna 305, an incoming RF signal transmitted by a gNB of the wireless network 100. The RF transceiver 310 down-converts the incoming RF signal to generate an intermediate frequency (IF) or baseband signal. The IF or baseband signal is transmitted to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor/controller 340 for further processing (such as for web browsing data).

The TX processing circuitry 315 receives analog or digital voice data from the microphone 320 or other outgoing baseband data (such as web data, e-mail, or interactive video game data) from the processor/controller 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor/controller 340 can include one or more processors or other processing devices and execute the basic OS 361 stored in the memory 360 in order to control the overall operation of the UE 116. For example, the processor/controller 340 can control the reception of forward channel signals and the transmission of reverse channel signals by the RF transceiver 310, the RX processing circuitry 325, and the TX processing circuitry 315 in accordance with well-known principles. In some embodiments, the processor/controller 340 includes at least one microprocessor or microcontroller.

The processor/controller 340 is also capable of executing other processes and programs resident in the memory 360, such as operations for channel quality measurement and reporting for a system having a 2D antenna array as described in embodiments of the disclosure. The processor/controller 340 can move data into or out of the memory 360 as required by an executing process. In some embodiments, the processor/controller 340 is configured to execute the applications 362 based on the OS 361 or in response to a signal received from a gNB or an operator. The processor/controller 340 is also coupled to the I/O interface 345, which provides the UE 116 with the ability to connect to other devices such as a laptop computer and a handheld computer. The I/O interface 345 is the communication path between these accessories and the processor/controller 340.

The processor/controller 340 is also coupled to an input device(s) 350 and a display 355. The operator of the UE 116 can use the input device(s) 350 to enter data into the UE 116. The display 355 may be a liquid crystal display or other display capable of rendering text and/or at least limited graphics, such as from web sites. The memory 360 is coupled to the processor/controller 340. Portion of the memory 360 can include a random access memory (RAM), and another portion of the memory 360 can include a Flash memory or other read-only memory (ROM).

Although FIG. 3a illustrates one example of UE 116, various changes may be made to FIG. 3a. For example, various components in FIG. 3a can be combined, further subdivided, or omitted and additional components can be added according to particular needs. As a particular example, the processor/controller 340 can be divided into multiple processors, such as one or more central processing units (CPUs) and one or more graphics processing units (GPUs). Also, while FIG. 3a illustrates the UE 116 configured as a mobile telephone or smartphone, UEs can be configured to operate as other types of mobile or stationary devices.

Figure 3B:
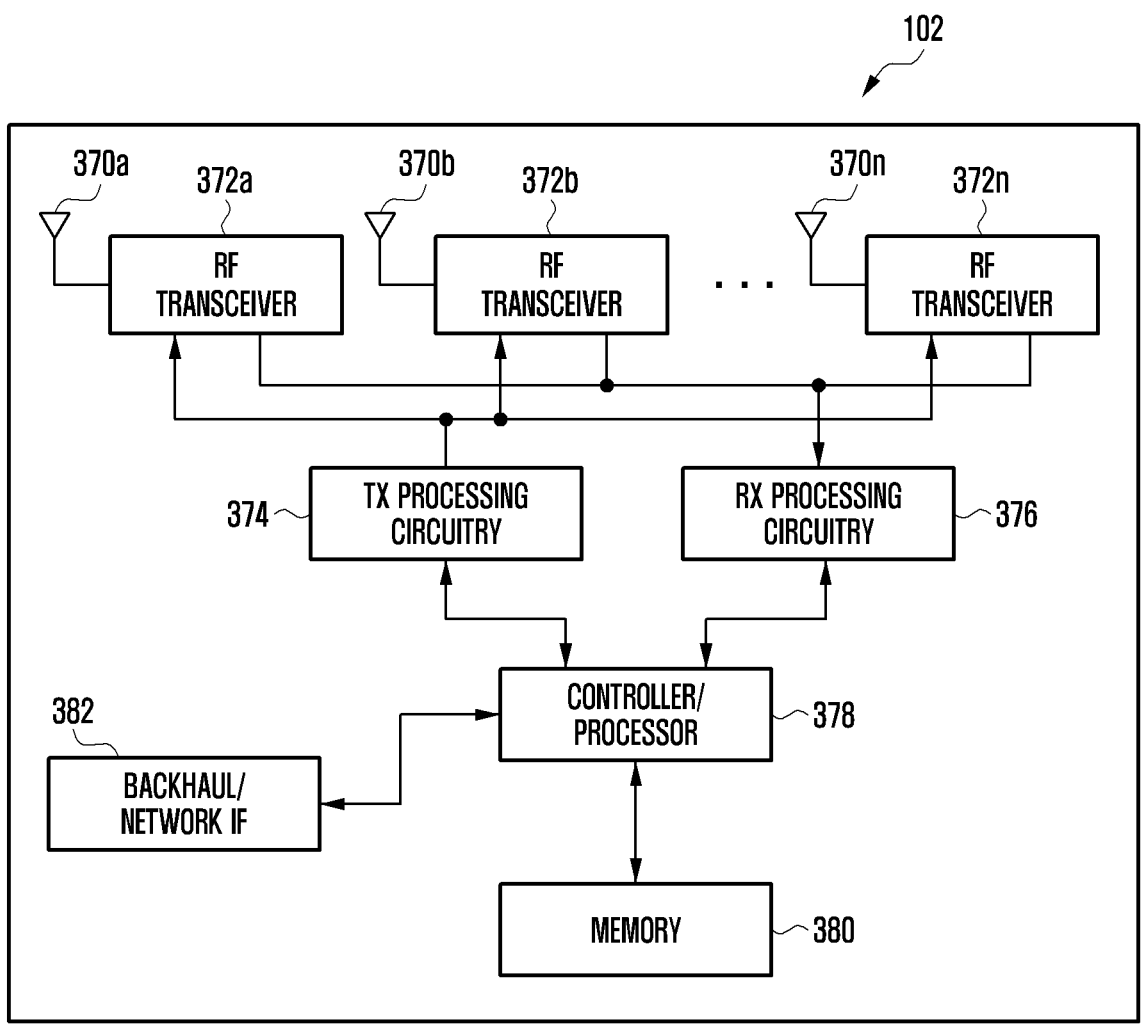
FIG. 3b illustrates an example gNB 102 according to the disclosure.

FIG. 3b illustrates an example gNB 102 according to some embodiments of the disclosure. The embodiment of the gNB 102 shown in FIG. 3b is for illustration only, and other gNBs of FIG. 1 can have the same or similar configuration. However, gNBs come in a wide variety of configurations, and FIG. 3b does not limit the scope of this disclosure to any particular implementation of a gNB. It is noted that gNB 101 and gNB 103 can include the same or similar structure as gNB 102.

As shown in FIG. 3b, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are transmitted to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. For instance, the controller/processor 378 can perform the blind interference sensing (BIS) process, such as performed by a BIS algorithm, and decodes the received signal subtracted by an interfering signal. Any of a wide variety of other functions can be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for a system having a 2D antenna array as described in embodiments of the disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as portion of a cellular communication system (such as one supporting 5G, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. Portion of the memory 380 can include a RAM, and another portion of the memory 380 can include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) support communication with aggregation of FDD cells and TDD cells.

Although FIG. 3b illustrates one example of a gNB 102, various changes may be made to FIG. 3b. For example, the gNB 102 can include any number of each component shown in FIG. 3. As a particular example, an access point can include a number of interfaces 382, and the controller/processor 378 can support routing functions to route data between different network addresses. As another particular example, while shown as including a single instance of TX processing circuitry 374 and a single instance of RX processing circuitry 376, the gNB 102 can include multiple instances of each (such as one per RF transceiver).

Figure 4:
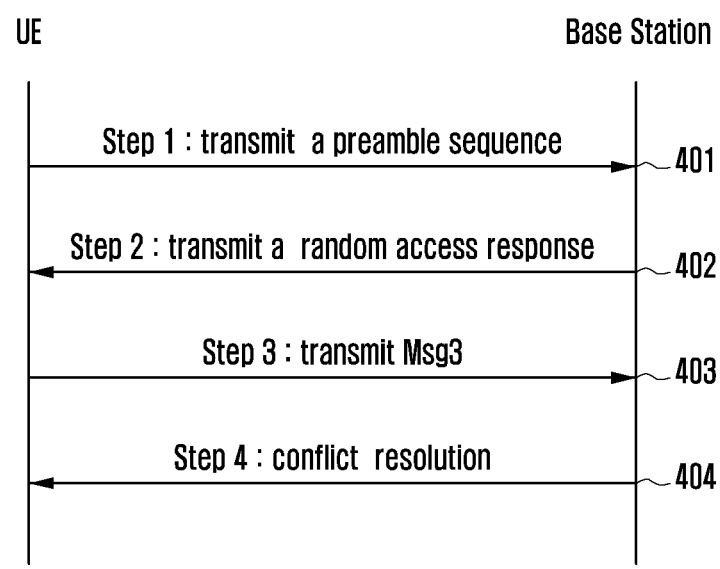
FIG. 4 illustrates a contention-based random access procedure according to an example of the disclosure.

FIG. 4 illustrates a contention-based random access procedure according to an example of the disclosure.

Transmissions in a wireless communication system include: a transmission from a base station (gNB) to a user equipment (UE) (called a downlink transmission), in which a corresponding slot is called a downlink slot, and a transmission from the UE to the base station (called an uplink transmission), in which a corresponding slot is called an uplink slot.

In the downlink communication of a wireless communication system, the system periodically transmits a synchronization signal and broadcast channel to a user through a synchronization signal block (SSB) (synchronization signal/PBCH block), where the period is a synchronization signal block periodicity (SSB periodicity), or called a synchronization signal block burst periodicity (SSB burst periodicity). At the same time, a base station will configure a random access configuration period (a Physical random access channel configuration period, or a PRACH configuration period), within which a certain number of random access transmission occasions (a random access transmission occasion is also called a random access occasion, a PRACH transmission occasion, or a RO) are configured, and all SSB can be mapped onto a corresponding RO within a mapping period (a certain length of time).

In a new radio (NR) communication system, before radio resource control is established, for example, in a random access procedure, the performance of random access directly affects user's experience. In a traditional wireless communication system, such as LTE and LTE-Advanced, the random access procedure is applied to multiple scenarios such as establishment of an initial link, cell handover, re-establishment of an uplink, RRC connection re-establishment, etc., and is divided into a Contention-based Random Access and a Contention-free Random Access depending on whether preamble sequence resources are monopolized by a user. Because in the contention-based random access, selecting, by each user, a preamble sequence from the same preamble sequence resource when trying to establish an uplink, which may cause multiple users to select the same preamble sequence to transmit to a base station, a conflict resolution mechanism is an important research direction in random access, and how to reduce the probability of a conflict and how to quickly resolve a conflict that has occurred are key indicators that affect the performance of random access.

The contention-based random access procedure in LTE-A is divided into four steps, as shown in FIG. 4.

In the first step (401), a user randomly selects a preamble sequence from a preamble sequence resource pool and transmits it to the base station. The base station performs correlation detection on the received signal to identify the preamble sequence transmitted by the user; in the second step (402), the base station transmits a Random Access Response (RAR) to the user, containing a random access preamble sequence identifier, a timing advance instruction determined according to an estimation of a time delay between the user and the base station, a Cell-Radio Network Temporary Identifier (C-RNTI), and a time-frequency resource allocated for the user's next uplink transmission; in the third step (403), the user transmits Message 3 (Msg3) to the base station according to information in the RAR. Msg3 contains information such as a user terminal identification and an RRC link request, where the user terminal identification is unique to the user and is used to resolve conflicts; in the fourth step (404), the base station transmits a conflict resolution identification to the user, containing a user terminal identification of a user terminal that has won the conflict resolution. After the user detects his own identification, he upgrades a temporary C-RNTI to the C-RNTI, transmits an ACK signal to the base station, completes the random access procedure, and waits for scheduling of the base station. Otherwise, the user will start a new random access procedure after a delay.

For the contention-free random access procedure, since the base station knows the identification of a user, the user can be assigned a preamble sequence. Therefore, when transmitting the preamble sequence, the user does not need to randomly select the sequence, but will use the allocated preamble sequence. After detecting the allocated preamble sequence, the base station transmits a corresponding random access response, including information such as a timing advance and uplink resource allocation. After receiving the random access response, the user considers that the uplink synchronization has been completed and waits for further scheduling of the base station. Therefore, the contention-free random access procedure only contains two steps: Step one for transmission of a preamble sequence; and Step two for transmission of a random access response.

The random access procedure in LTE is applicable to the following scenarios:
1. Initial access in RRC_IDLE;
2. Re-establishing an RRC connection;
3. Cell handover;
4. In an RRC connected state, a downlink data arriving and requesting the random access procedure (when an uplink is asynchronous);
5. In an RRC connected state, an uplink data arriving and requesting the random access procedure (when an uplink is asynchronous or a resource is not allocated for a scheduling request in PUCCH resources); and
6. Positioning.

Figure 5:
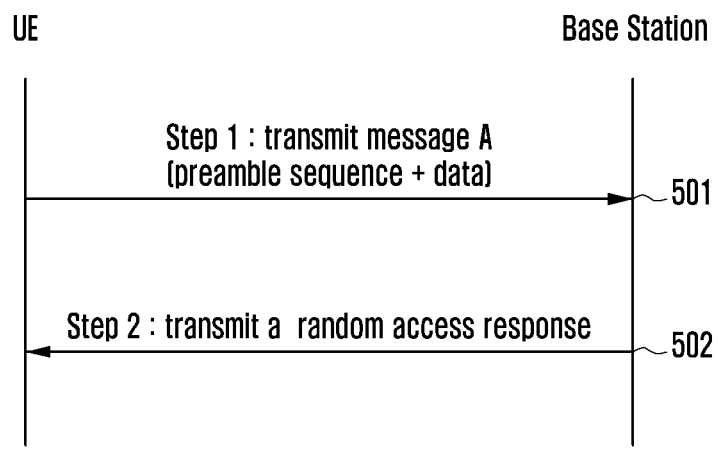
FIG. 5 illustrates a random access procedure according to another example of the disclosure.

FIG. 5 illustrates a two-step random access procedure according to another example of the disclosure.

In some communication systems (in licensed spectrum and/or unlicensed spectrum), in order to achieve faster signal transmission and reception, it is considered to transmit a random access preamble together with a data portion (denoted as a first message, that is, message A)(501), and then search for a feedback from a network device in a downlink channel (denoted as a second message, that is, message B)(502). However, because of existence of different uplink signals, the UE will encounter the problem of how to process multiple uplink signals.

Specifically, in the disclosure, a UE obtains resource configuration information of an uplink signal from information configured and/or pre-configured by a network side to obtain a resource configuration of two-step random access, and performs transmission of the two-step random access. The resource configuration information includes at least one of:

1. Four-step random access configuration information (that is, regular random access configuration information), including at least one of:
    A four-step random access configuration period (P_4STEPRACH);
    A four-step random access occasion time unit index (such as a slot index, a symbol index, a subframe index, etc.);
    A four-step random access occasion frequency domain unit index (such as a carrier index, a BWP index, a PRB index, a subcarrier index, etc.);
    A number of four-step random access occasions;
    A four-step random access preamble format (such as a cyclic prefix (CP) length, a preamble sequence length and a number of repetitions, a guard interval (GT) length, a used subcarrier spacing size, etc.);
    A number of four-step random access preambles, an index of a root sequence, and a cyclic shift value;
    A number of SSBs that can be mapped on a four-step random access occasion (4STEPRO, 4 step RACH occasion);
    One or more CSI-RS indices for four-step random access;
    A number of 4STEPROs mapped by a CSI-RS; and
    One or more 4STEPRO indices mapped by a CSI-RS.
2. Two-step random access configuration information, including at least one of:
    A two-step random access configuration period (P_2STEPRACH);
    A two-step random access occasion time unit index (such as a slot index, a symbol index, a subframe index, etc.);
    A two-step random access occasion frequency domain unit index (such as a carrier index, a BWP index, a PRB index, a subcarrier index, etc.);
    A number of two-step random access occasions;
    A two-step random access preamble format (such as a cyclic prefix (CP) length, a preamble sequence length and a number of repetitions, a guard interval (GT) length, a subcarrier spacing size adopted, etc.);
    A number of two-step random access preambles, an index of a root sequence, and a cyclic shift value;
    A number of SSBs that can be mapped on a two-step random access occasion (2STEPRO, 2 step RACH occasion);
    One or more CSI-RS indices for the two-step random access;
    A number of 2STEPROs mapped by a CSI-RS; and
    One or more 2STEPRO indices mapped by a CSI-RS.

In some cases, if the parameters in the above two-step random access configuration information are not configured separately, they can determined, by the UE, according to a relative relationship with corresponding parameters in the four-step random access configuration information, for example, a two-step random access configuration period is obtained by calculating a four-step random access configuration period with a predefined or preconfigured extension parameter.

3. Downlink beam (for example, SSB and/or CSI-RS) configuration information, including at least one of:
    A size of a downlink beam period;
    A number of downlink beams transmitted within a downlink beam period;
    Indices of downlink beams transmitted within a downlink beam period;
    Time unit positions of downlink beams transmitted within a downlink beam period; and Frequency domain unit positions of downlink beams transmitted within a downlink beam period.

4. Data resource configuration information for the two-step random access, that is, resource configuration information for a physical uplink shared channel (PUSCH), (a PUSCH resource unit including a PUSCH time-frequency resource unit and a DMRS resource), including at least one of:

Time-frequency resource configuration information of a PUSCH; including at least one of:
  One or more PUSCH time-frequency resource unit sizes (that is, PUSCH time-frequency resource sizes corresponding to a two-step random access preamble, including M time units and N frequency domain units. If there are multiple PUSCH time-frequency resource units, sizes of different PUSCH time-frequency resource units may be different, that is, a value of M and/or N will be different as the PUSCH time-frequency resource units are different), which can be obtained by looking up a table;
  A time-frequency resource configuration period of the PUSCH (P_PUSCH);
  A time unit index of a PUSCH time-frequency resource unit (such as a slot index, a symbol index, a subframe index, etc.);
  A frequency domain unit index of a PUSCH time-frequency resource unit (such as a carrier index, a BWP index, a PRB index, a subcarrier index, etc.);
  A time domain start position of PUSCH time-frequency resources; where the time domain start position may be a time domain interval between time ranges of the PUSCH time-frequency resources configured by a network device and the corresponding two-step random access time-frequency resource, that is, N time units; and/or a length of time occupied by the PUSCH time-frequency resources configured by the network device, that is, M1 time units or M1 time-frequency resource units of the two-step random access PUSCH (the time-frequency resource unit is defined as a size of time-frequency resources for transmitting a data portion of a specific size, which is composed of predefined X time units and Y frequency domain units); there may be a guard interval (delta time units) between two adjacent time-frequency resources of the two-step random access PUSCH in the same slot, which may be in the time-frequency resource units of the PUSCH (that is, the delta time units are included in the X time units), or outside the time-frequency resource units of the PUSCH (that is, the delta time units are not included in the X time units). In particular, the configured M1 time-frequency resource units of the two-step random access PUSCH are directed to the time range of the corresponding two-step random access time-frequency resource, for example, M1 time-frequency resource units of the two-step random access PUSCH configured by the base station device can be found from a given RACH slot, and the corresponding M1 time-frequency resource units of the two-step random access PUSCH configured by the base station device can also be found from another RACH slot;
  A frequency domain start position of the PUSCH time-frequency resources. The frequency domain start position is pre-defined or configured. For example, the frequency domain start position of the two-step random access PUSCH is N frequency domain units after a frequency domain position; where, the frequency domain position may be:
    i) Bandwidth part (bwp); a frequency domain start position (for example, the first frequency domain unit) of a carrier
    ii) A frequency domain start position (for example, the first frequency domain unit) of the selected two-step random access RO;
    And/or M2 frequency domain units (or resource units of the two-step random access PUSCH). There may be a guard carrier (delta frequency domain units) between two adjacent resources of the two-step random access PUSCH in frequency domain in the same time, and the guard carrier can be in the resource units of the PUSCH (that is, the delta frequency domain units are included in the Y frequency domain units), or outside the resource units of the PUSCH (that is, the delta frequency domain units are not included in the Y frequency domain units);
  Specifically, the indicated time-domain start position of the PUSCH time-frequency resources is a position of the first PUSCH time-frequency resource unit, and/or the indicated frequency-domain start position of the PUSCH time-frequency resources is a position of the first PUSCH time-frequency resource unit; other time-frequency resources corresponding to all two-step random access time-frequency resources within the time range of the two-step random access time-frequency resource selected by the UE are derived sequentially in the manner of frequency domain first and then time domain, or time domain first and then frequency domain;
  A number of PUSCH time-frequency resource units (or a number of PUSCH time-frequency resource units in time domain and/or a number of PUSCH time-frequency resource units in frequency domain configured respectively);
  A PUSCH time-frequency resource unit format (such as a number of repetitions, a guard interval (GT) length, a guard frequency domain interval (GP), etc.);
  A number of downlink beams that can be mapped on a PUSCH time-frequency resource unit;
  One or more downlink beam indices for a two-step random access PUSCH transmission;
  A number of PUSCH time-frequency resource units mapped by a downlink beam;
  One or more PUSCH time-frequency resource unit indices mapped by a downlink beam;
  Specifically, when the UE determines the positions of the PUSCH time-frequency resource units on each slot through the above configurations, certain configurations may cause the PUSCH time-frequency resource units determined by the UE to include a slot boundary (here, the slot boundary is taken as an example, and it can be other time domain units), or to beyond the slot and be in the adjacent or subsequent slot.

Figure 6:
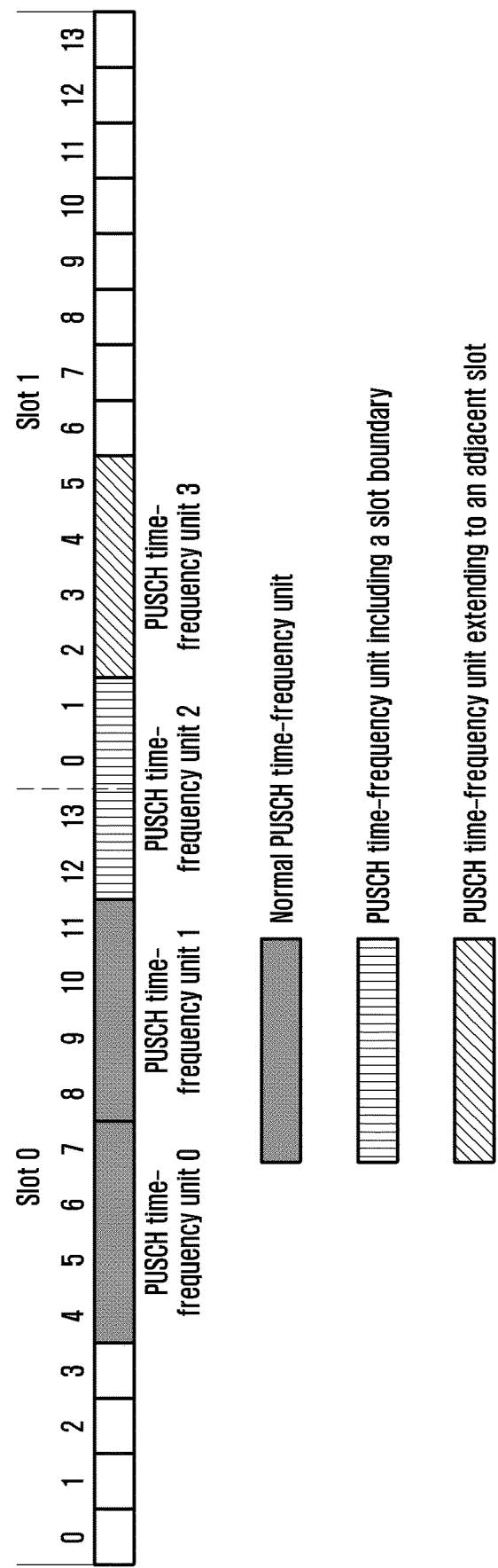
FIG. 6 illustrates an example of PUSCH resource determination according to an embodiment of the disclosure.

FIG. 6 illustrates an example of PUSCH resource determination according to an embodiment of the disclosure.

As shown in FIG. 6, the UE determines that slot 0 is a start slot of the PUSCH resources, and then each PUSCH time-frequency resource unit occupies 4 OFDM symbols starting from symbol 4 in slot 0, and is configured with 4 PUSCH time-frequency resource units, then PUSCH time-frequency resource unit 2 includes the slot boundary (i.e., spans the boundary), and the position of PUSCH time-frequency resource unit 3 extends beyond the slot to adjacent slot 1. In view of the above cases, the UE may have at least one of the following operations:

a) Segmenting a PUSCH time-frequency resource unit spanning across a boundary according to the spanned boundary; for example, a PUSCH time-frequency resource unit 2 in FIG. 6 is segmented into two parts, where the first part is symbols 12 and 13 in slot 0, which is a part of the PUSCH time-frequency resource unit remaining in the current slot; the second part is symbols 0 and 1 in slot 1, that is, the second part is equivalent to a part of the PUSCH time-frequency resource unit extending to an adjacent slot; a part of a PUSCH time-frequency resource unit can also be considered as a special PUSCH time-frequency resource unit determined by the UE. Preferably, when a part of a PUSCH time-frequency resource unit is less than (or not greater than or equal to) a configured or fixed length (for example, 1 symbol), the part of the PUSCH time-frequency resource unit is considered to be invalid; when a part of a PUSCH time-frequency resource unit is greater than (or not less than) a configured or fixed length, the part of the PUSCH time-frequency resource unit is considered to be valid;

b) Determining a PUSCH time-frequency resource unit and/or a part of the PUSCH time-frequency resource unit extending to the adjacent or subsequent slot as invalid PUSCH time-frequency resource unit and/or invalid part of the PUSCH time-frequency resource unit. That is, when a PUSCH time-frequency resource unit and/or a part of the PUSCH time-frequency resource unit is within the current slot (not beyond the current slot boundary), it is valid, and the current slot means that the PUSCH time-frequency resource unit and/or the part of the PUSCH time-frequency resource unit is obtained according to a start position of the first PUSCH time-frequency resource unit in the slot, a number of time-domain units of the PUSCH time-frequency resource unit, and a number of PUSCH time-frequency resource units configured in the slot. Preferably, if the PUSCH time-frequency resource unit and/or the part of the PUSCH time-frequency resource unit extending to the adjacent or subsequent slot does not overlap with PUSCH time-frequency resource units in the adjacent or subsequent slot, or an interval therebetween is greater than (or not less than) a certain threshold value (for example, a fixed or configured guard period), the PUSCH time-frequency resource unit and/or the part of the PUSCH time-frequency resource unit extending to the adjacent or subsequent slot is still valid;

c) Preferably, the above validation determination can be combined with existing validation determinations, For example, in addition to the above conditions, if a PUSCH time-frequency resource unit and/or a part of the PUSCH time-frequency resource unit extending to the adjacent or subsequent slot does not overlap with downlink symbols or SSBs, or an interval therebetween is less than (or not greater than) a certain threshold value (such as a fixed or configured interval value), or does not overlap with the configured (or valid) RO, the PUSCH time-frequency resource unit and/or the part of the PUSCH time-frequency resource unit extending to the adjacent or subsequent slot is considered to be valid;

d) Preferably, when the UE transmits a signal on a part of a PUSCH time-frequency resource unit, a coding rate and/or modulation mode (that is, rate matching) should be reselected according to a transport block size (TBS) determined on a normal PUSCH time-frequency resource unit; or data preparation is performed according to the transmission block size (TBS) and the coding rate and/or modulation mode determined on the normal PUSCH time-frequency resource unit, but during transmission, signals that beyond the part of the PUSCH time-frequency resource unit are not transmitted (that is, punctured);

e) Preferably, the UE does not expect the received configuration to cause the determined PUSCH time-frequency resource unit and/or a part of the PUSCH time-frequency resource unit (and/or the fixed or configured guard period) to span cross a slot interval or extend to the adjacent or subsequent slot; that is, the UE assumes or expects the determined PUSCH time-frequency resource unit (and/or a guard period) to not span across the slot interval or not extend to the adjacent or subsequent slot;

f) Preferably, the above slots are only exemplary time domain units, and may be other time domain units, such as subframes, or system frames;

g) Preferably, the above length of the PUSCH time-frequency resource unit may also be a length including a fixed or configured guard period.

DMRS configuration information, including at least one of:

A number of DMRS ports N_DMRS available on a PUSCH time-frequency resource unit and/or an index (that is, each DMRS port corresponds to its own port configuration information) and/or an DMRS sequence index (for example, it may be a scrambling ID, etc.); and DMRS port configuration information, including at least one of:
  i. A sequence type, such as indicating whether it is a ZC sequence, a gold sequence, etc.;
  ii. A cyclic shift interval;
  iii. A sequence length, that is, subcarriers occupied by the DMRS sequence;
  iv. A time domain orthogonal cover code (TD-OCC); for example, a TD-OCC with a length of 2 can be: [+1, −1], [−1, +1];
  v. A frequency domain orthogonal cover code (FD-OCC); for example, an FD-OCC with a length of 2 can be: [+1, −1], [−1, +1];
  vi. A comb configuration, including a comb size and/or a comb offset; for example, if the size is 4 and the offset is 0, it represents the 0th RE of every 4 REs in the DMRS sequence; if the size is 4 and the offset is 1, it represents the first RE of every 4 REs in the DMRS sequence.

5. Configuration type information; for the data resource configuration information of the two-step random access, a network side may have two possible configuration types:

Type1: The UE obtains data resources for the configured two-step random access through separate data resource configuration information of the two-step random access from the network side, and then the UE can obtain a mapping relationship between random access resources and data resources through the defined mapping parameters and/or rules of the random access resources and the data resources;

Type 2: The network side obtains data resources of the configured two-step random access and obtains the mapping relationship between the random access resources and the data resources though random access resources for the configured two-step random access, and then by configuring a relative time-frequency relationship between the data resources of the two-step random access and the random access resources of the two-step random access (for example, a time domain and/or frequency domain interval), and/or though the defined mapping parameters and/or rules of the random access resources and the data resources;

Regarding part or all of the above resource configuration information, the UE may obtain it from at least one of:
1. A random access feedback (RAR) of the random access procedure, for example, uplink grant (UL grant) information;
2. Downlink control information scheduling an uplink transmission, for example, uplink grant (UL grant) information or a separate DCI configuration; where the scheduled uplink transmission may be a new transmission of data or a retransmission of data;
3. A system message transmitted by the network side or a high layer control signaling such as an RRC configuration message obtained by the UE; and
4. Preconfigured parameter information.

Specifically, the UE may obtain part or all of the resource configuration information through at least one of the above methods. For example, the time-frequency resource configuration information of the PUSCH is obtained through the system message, and the DMRS configuration information is obtained through the RRC configuration in-formation of the UE.

Specifically, when the configured two-step random access and four-step random access share random access time-frequency resources, the two-step random access can share part of the random access time-frequency resources of the four-step random access, and the UE can obtain part of the shared ROs for the two-step random access.

The UE may obtain information on the mapping from a downlink beam (taking SSB as an example) to a RO (including a four-step random access RO and/or a two-step random access RO) based on the above configuration information, the information on the mapping including at least one of:

A SSB-RO mapping period (such as a number of random access configuration periods required to complete at least one SSB-RO mapping);

A SSB-RO mapping pattern period (such as a length of time ensuring that the SSB-RO mappings within two adjacent mapping pattern periods are exactly the same, such as a number of required SSB-RO mapping periods, or a number of required random access configuration periods).

Similarly, the UE may obtain information on CSI-RS-RO mapping based on the above configuration information, including at least one of:

A CSI-RS-RO mapping period (such as a number of random access configuration periods required to complete at least one CSI-RS-RO mapping within a CSI-RS-RO mapping period);

A CSI-RS-RO mapping pattern period (such as a length of time ensuring that the CSI-RS-RO mapping mappings within two adjacent CSI-RS-RO mapping pattern periods are exactly the same, such as a number of required periods of the CSI-RS-RO mapping, or a number of required random access configuration periods).

For determining a resource configuration for the two-step random access, the UE also needs to determine a mapping relationship between the random access resources of the two-step random access and the data resources of the two-step random access, including at least one of:
1. A period of the mapping between the random access resources of the two-step random access and the data resources of the two-step random access,
2. A rule of the mapping between the random access resources of the two-step random access and the data resources of the two-step random access, such as a parameter of mapping of the random access resources to the data resources, etc.

According to the above received configuration information, the UE may obtain the four-step random access configuration information and the two-step random access configuration information at the same time, and the UE can be indicated which kind of random access to perform through directly configuring by the base station; or through an RSRP threshold value configured by the base station; if the RSRP measured by the UE is higher than the threshold value, the two-step random access is selected; otherwise, the four-step random access is performed.

After determining to perform the two-step random access, the UE determines the random access resources and data resources for the two-step random access configured by the base station device according to the above received configuration information. The UE needs to detect validation of the random access resources and data resources according to a certain rule, that is, determine whether the configured random access resources and data resources are available, so as to obtain: a valid random access resource of the two-step random access (valid msgA PRACH resource), for example, a valid PRACH occasion; and a valid data resource of the two-step random access (valid PUSCH resource), for example, a valid PUSCH time-frequency resource unit (valid PUSCH occasion).

For OFDM symbols (a symbol group) occupied by a valid PUSCH time-frequency resource, and/or Ngap OFDM symbols (a symbol group) before the valid PUSCH time-frequency resource, if a received PDCCH, PDSCH or CSI-RS partially overlaps with the symbols (symbol group), the UE does not receive the PDCCH, PDSCH or CSI-RS in the slot where the symbols (symbol group) are located, where Ngap is a preset number of symbols. The UE does not expect a received time division uplink and downlink common configuration or a time division uplink and downlink separate configuration to configure the symbols (symbol group) to be downlink and/or flexible; and/or the UE does not expect a value of a slot format indication index carried by a received downlink control information format 2_0 (DCI format 2_0) to indicate that the symbols (symbol group) are downlink and/or flexible.

Through the above method, a valid PUSCH occasion in the two-step random access can be protected.

After the UE makes a determination of the validation of the resources, the obtained valid random access resources of the two-step random access and the valid data resources of the two-step random access are mapped within a certain period, where the certain period can be at least one of:

1. A predefined period, for example, 10 millisecond, 20 millisecond, 40 millisecond, 80 millisecond, 160 millisecond, etc.
2. A relevant period of the random access resources of the two-step random access;

the relevant period of the random access resources of the two-step random access may include at least one of: a mapping ring from a downlink beam to the random access resources of the two-step random access, for example, a mapping ring from an SSB to a RO; a configuration period of the random access resources for two-step or four-step random access; a period of the mapping from a downlink beam to the random access resources of the two-step or four-step random access; a period of the mapping pattern from a downlink beam to the random access resources of the two-step or four-step random access. It should be understood that the above-listed items are only exemplary, and the disclosure is not limited thereto.

3. A relevant period of the data resources of the two-step random access; the relevant period of the data resources of the two-step random access may include at least one of: a mapping ring from a downlink beam to the data resources of the two-step random access, for example, a mapping loop from the SSB to the PUSCH; a configuration period of the data resources of the two-step random access; a mapping period from a downlink beam to data resources of the two-step random access; a period of the mapping pattern from a downlink beam to the data resources of the two-step random access. It should be understood that the above-listed items are only exemplary, and the disclosure is not limited thereto.

4. The larger period or the smaller period among the relevant period of the random access resources of the two-step random access and the relevant period of the data resources of the two-step random access.

After the validation determination and the mapping operation, the UE can find available PUSCH resources (PUSCH time-frequency resources and DMRS resources) through the determined (selected) two-step random access RO and preamble, and through the mapping result. If N>1 PUSCH resources are found, the UE selects a PUSCH resource from them with equal probability for corresponding PUSCH transmission.

Alternatively, a UE may also have other uplink transmissions when performing the two-step random access (or four-step random access) (such as an uplink transmission scheduled by a DCI or an uplink transmission configured by a higher layer), and the UE needs to process a problem of multiple uplink signal transmissions.

If a UE has one or more of the following signals as signal X:
Message A for the two-step random access (msgA);
A random access signal of message A (msgA PRACH);
A data portion signal of message A (msgA PUSCH);
Message 1 for the four-step random access (PRACH);
And/or the UE has one or more of the following signals as signal Y:
An uplink control channel with higher priority (PUCCH with larger priority index), for example, priority index 1;
An uplink control channel with lower priority (PUCCH with smaller priority index), for example, priority index 0;
An uplink shared channel with higher priority (PUSCH with larger priority index), for example, priority index 1;
An uplink shared channel with lower priority (PUSCH with smaller priority index), for example, priority index 0;
A Sounding Reference Signal (SRS); specifically:
A periodic SRS has the higher priority; and an aperiodic SRS has the lower priority;
A periodic SRS has the lower priority; and an aperiodic SRS has the higher priority;
A periodic SRS and aperiodic SRS have the same higher (or lower) priority; or
Other uplink signals with different timing advance adjusting values from that of message X;
And when signal X and information Y have at least one of the following cases:
Transmission occasions of signal X and signal Y overlap (partially or completely overlap) in time and/or frequency domain;
Transmission occasions of signal X and signal Y are in the same slot; the slot may be determined by signal X or signal Y or a subcarrier spacing of the corresponding BWP;
Signal X and signal Y are not in the same slot; but
An interval between the last OFDM symbol of signal X in the previous slot and the first OFDM symbol of signal Y in the latter slot is less than (and/or equal to) a predefined threshold value N (or configured by a network); and/or,
An interval between the last OFDM symbol of signal Y in the previous slot and the first OFDM symbol of signal X in the latter slot is less than (and/or equal to) a predefined threshold value N (or configured by a network);

The UE can perform a combination of one or more of the following processes:
The UE transmits signal X but does not transmit signal Y; that is, signal X is considered to have a higher priority; the priority of signal X (a random access related signal) is protected;
The UE selects, according to UE implementation, a signal to transmit, that is, the UE can transmit signal X but not signal Y, or the UE can transmit signal Y but not signal X; that is, the UE does not transmit both signal X and signal Y;
The UE transmits a signal that occurs first, for example, if signal X occurs before signal Y, the UE transmits the signal X; otherwise, the UE transmits signal Y;
The UE transmits signal Y but does not transmit signal X; that is, signal Y is considered to have the higher priority; the priority of signal Y is protected;
In some cases, in the above multiple operations, when the UE does not transmit signal X, and signal X is a random access signal of message A (msgA PRACH), then if the random access signal of message A has a corresponding data portion signal of message A, the UE does not transmit the corresponding data portion signal of message A (msgA PUSCH)
Alternatively, a possible operation may also be a combination of one or more of the above operations. For example, the UE may consider information X, which is the random access signal of message A, as a signal with the higher priority when compared with signal Y, and consider information X, which is the data portion signal of message A (msgA PUSCH), as a signal with the lower priority when compared with signal Y.

Through the above method, it is possible to process how to determine a transmitted uplink signal in a case where transmission of the message used for random access overlaps with other uplink signals, is in the same time unit with the other uplink signals or is close to the other uplink signals.

Figure 7:
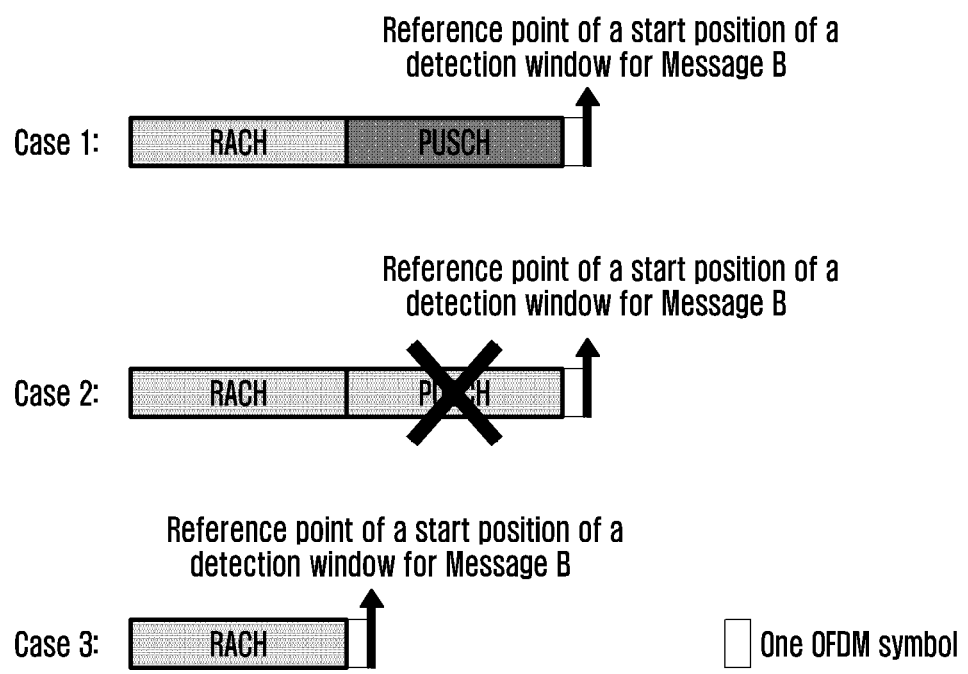
FIG. 7 illustrates an example of how to determine a reference point of a start position of a detection window for message B according to the disclosure.

FIG. 7 illustrates an example of how to determine a reference point of a start position of a detection window for message B according to the disclosure.

After the UE transmits message A, the UE will search for a possible two-step random access feedback in a control information search space configured by the network, where, alternatively, When one or more of the following cases occur, the UE attempts to detect a downlink control information format 0_1 (DCI format 0_1) with CRC scrambled by a msgB-RNTI corresponding to the selected random access occasion during a window controlled by a higher layer; the window starts from a position which is the first OFDM symbol of the earliest control resource set in a Type1 downlink control channel common search space set (Type1-PDCCH CSS set) configured for the UE that is after one OFDM symbol from the end position (e.g., the last OFDM symbol) of the corresponding PUSCH time-frequency resource unit ; where the length of a OFDM symbol is determined by the SCS for the Type1 downlink control channel common search space set; at the same time, the length of the window is calculated in number of slots, the number of which is indicated by a configured feedback window for message B, and the length of a slot is determined by the SCS for the Type1 downlink control channel common search space set; the one or more cases are:

The UE transmits a complete message A, that is, transmits a random access preamble and a PUSCH (an example case1 as shown in FIG. 7);

The UE transmits an incomplete message A, that is, transmits only a preamble, and its corresponding PUSCH resource is valid, but the PUSCH transmission is cancelled due to one or more of the following reasons (an example case2 as shown in FIG. 7):

Due to power allocation for PUSCH/PUCCH/PRACH/SRS transmission, a PUSCH of message A is not transmitted;

Due to power allocation in double chain (DC), such as EN-DC, NE-DC, and NR-DC, a PUSCH of message A is not transmitted;

Because the UE does not detect a downlink control information format 2_0 that provides a slot format, a PUSCH of message A is not transmitted;

Because the UE detects the downlink control information format 2_0 that provides a slot format, but the detected slot format indicates that symbols occupied by the PUSCH are flexible or downlink, a PUSCH of message A is not transmitted;

Due to an operation of determining a slot format, a PUSCH of message A is not transmitted;

Due to overlapping with uplink signals (PUCCH, PUSCH) with a higher priority

When the UE transmits an incomplete message A, that is, only a preamble and no corresponding (valid) PUSCH resources; in an example case3 as shown in FIG. 7, the UE attempts to detect a downlink control information format 0_1 (DCI format 0_1) with CRC scrambled by a msgB-RNTI corresponding to the selected random access occasion in a window controlled by a higher layer; the window starts from a position which is the first OFDM symbol of the earliest control resource set in a Type1 downlink control channel common search space set (Type1-PDCCH CSS set) configured for the UE that is after at least one symbol from the end position (for example, the last OFDM symbol) of a corresponding PRACH; where the length of a OFDM symbol is determined by the SCS for the Type1 downlink control channel common search space set; at the same time, a length of the window is calculated in number of slots, the number of which is indicated by a configured feedback window for message B, and the length of a slot is determined by the SCS for the Type1 downlink control channel common search space set.

The UE performs subsequent operations according to the type of the received downlink feedback and content in the downlink feedback.

Through the above method, it is possible to determine reference points of start positions of different random access response windows with respect to different transmissions of the message used for random access.

Figure 8:
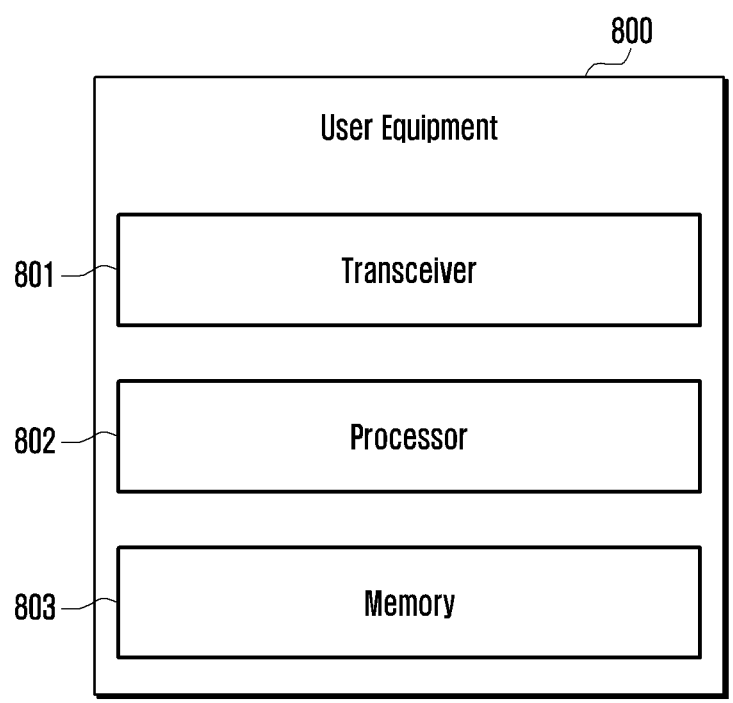
FIG. 8 is a block diagram illustrating a UE according to an embodiment of the disclosure.

FIG. 8 is a block diagram illustrating a UE according to an embodiment of the disclosure.

Referring to FIG. 8, the UE (800) includes a transceiver (801), a processor/controller (802), and a memory (803). The transceiver (801), the processor/controller (802), and the memory (803) are configured to perform the operations of the UE shown in the figures (for example, FIGS. 1-7) or the operations of the UE described above.

Figure 9:
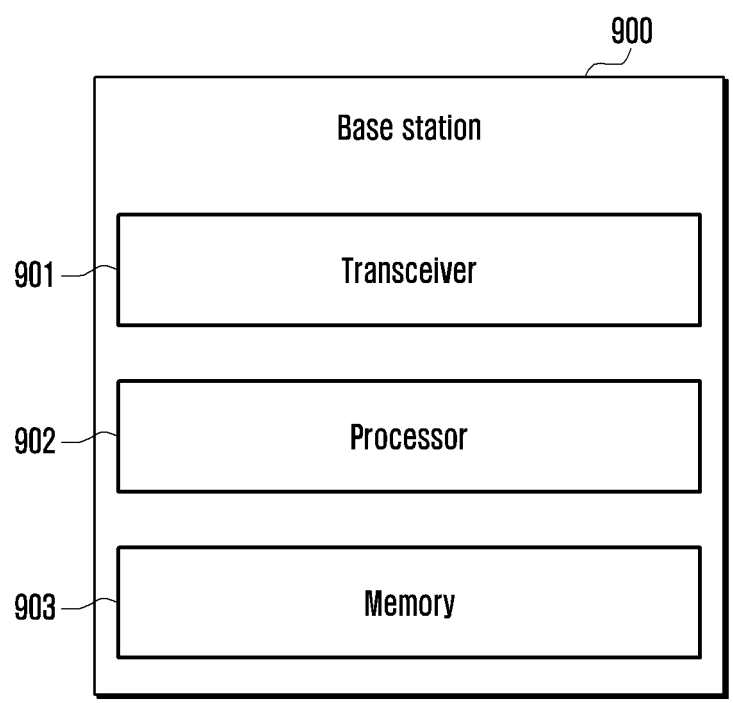
FIG. 9 is a block diagram illustrating a base station according to an embodiment of the disclosure.

FIG. 9 is a block diagram illustrating a base station according to an embodiment of the disclosure.

Referring to FIG. 9, the base station (900) includes a transceiver (901), a processor/controller (902), and a memory (903). The transceiver (901), the processor/controller (902), and the memory (903) are configured to perform the operations of the base station shown in the figures (for example, FIGS. 1-7) or the operations of the base station described above.

The above descriptions are only the preferred embodiments of the disclosure and are not intended to limit the disclosure. Any modification, equivalent replacement, improvement, etc. made within the spirit and principle of the disclosure should be included within the scope claimed by the disclosure.

It can be understood by those skilled in the art that the disclosure includes devices related to performing one or more of the operations described in the disclosure. These devices may be specially designed and manufactured for the desired purpose, or they may include known devices in general-purpose computers. These devices have computer programs stored therein that are selectively activated or reconfigured. Such computer programs may be stored in a device (e.g., computer) readable medium including, but not limited to, any type of disk (including floppy disk, hard disk, optical disk, CD-ROM, and magneto-optical disk), ROM (Read-Only Memory), RAM (Random Access Memory), EPROMO (erasable programmable read-only memory), EEPROM (electrically erasable programmable read-only memory), flash memory, magnetic card or optical card. That is, a readable medium includes any medium that stores or transmits information in a readable form by a device (e.g., a computer).

It can be understood by those skilled in the art that each block in these structural diagrams and/or block diagrams and/or flow diagrams and combinations of blocks in these structural diagrams and/or block diagrams and/or flow diagrams may be implemented by computer program instructions. It can be understood by those skilled in the art that these computer program instructions may be provided to a processor of a general-purpose computer, a professional computer or other programmable data processing methods for implementation, so that the solutions specified in the block or blocks of the structural diagram and/or block diagram and/or flow diagram disclosed by the disclosure may be executed by the processor of the computer or other programmable data processing methods.

It can be understood by those skilled in the art that the steps, measures and schemes in various operations, methods and processes discussed in the disclosure may be alternated, modified, combined or deleted. Further, other steps, measures and schemes in various operations, methods and processes discussed in the disclosure may be alternated, modified, rearranged, decomposed, combined or deleted. Further, the steps, measures and schemes in various operations, methods and processes discussed in the disclosure in the prior art may be alternated, changed, rearranged, decomposed, combined or deleted.

The above is only part of embodiments of the disclosure, and it should be pointed out that for one of ordinary skill in the art, without departing from the principles of the disclosure, several changes and modifies may be made, which should also be regarded as the protection scope of the disclosure.

The invention claimed is:

1. A method performed by a terminal in a wireless communication system, the method comprising:
   receiving, from a base station, configuration information related to a two-step random access;
   transmitting, to the base station, a random access preamble for the two-step random access based on the configuration information; and
   attempting to detect downlink control information (DCI) scrambled by a message B-radio network temporary identifier (MsgB-RNTI) during a window,
   wherein in case that the random access preamble is mapped to a valid physical uplink shared channel (PUSCH) occasion and a PUSCH associated with the random access preamble is not transmitted, the window starts from a first symbol of an earliest control resource set configured for the terminal after a last symbol of the valid PUSCH occasion.

2. The method of claim 1, wherein in case that the random access preamble is not mapped to the valid PUSCH occasion, the window starts from the first symbol of the earliest control resource set configured for the terminal after a last symbol of a physical random access channel (PRACH) occasion corresponding to the random access preamble.

3. The method of claim 1, wherein a length of the window is based on a number of slots provided by the configuration information and subcarrier spacing (SCS) for a type 1 downlink control channel common search space set.

4. The method of claim 3, wherein a duration of the last symbol of the valid PUSCH occasion corresponds to the SCS for the type 1 downlink control channel common search space set.

5. A terminal in a wireless communication system, the terminal comprising:
   a transceiver; and
   a controller coupled with the transceiver and configured to:
      receive, from a base station via the transceiver, configuration information related to a two-step random access,
      transmit, to the base station via the transceiver, a random access preamble for the two-step random access based on the configuration information, and
      attempt to detect downlink control information (DCI) scrambled by a message B-radio network temporary identifier (MsgB-RNTI) during a window,
   wherein in case that the random access preamble is mapped to a valid physical uplink shared channel (PUSCH) occasion and a PUSCH associated with the random access preamble is not transmitted, the window starts from a first symbol of an earliest control resource set configured for the terminal after a last symbol of the valid PUSCH occasion.

6. The terminal of claim 5, wherein in case that the random access preamble is not mapped to the valid PUSCH occasion, the window starts from the first symbol of the earliest control resource set configured for the terminal after a last symbol of a physical random access channel (PRACH) occasion corresponding to the random access preamble.

7. The terminal of claim 5, wherein a length of the window is based on a number of slots provided by the configuration information and subcarrier spacing (SCS) for a type 1 downlink control channel common search space set.

8. The terminal of claim 7, wherein a duration of the last symbol of the valid PUSCH occasion corresponds to the SCS for the type 1 downlink control channel common search space set.

9. A method performed by a base station in a wireless communication system, the method comprising:
   transmitting configuration information related to a two-step random access;
   receiving, from a terminal, a random access preamble for the two-step random access according to the configuration information; and
   transmitting, to the terminal, downlink control information (DCI) scrambled by a message B-radio network temporary identifier (MsgB-RNTI) while a window is running,
   wherein in case that the random access preamble is mapped to a valid physical uplink shared channel (PUSCH) occasion and a PUSCH associated with the random access preamble is not received, the window starts from a first symbol of an earliest control resource set configured for the terminal after a last symbol of the valid PUSCH occasion.

10. The method of claim 9, wherein in case that the random access preamble is not mapped to the valid PUSCH occasion, the window starts from the first symbol of the earliest control resource set configured for the terminal after a last symbol of a physical random access channel (PRACH) occasion corresponding to the random access preamble.

11. The method of claim 9, wherein a length of the window is based on a number of slots according to the configuration information and subcarrier spacing (SCS) for a type 1 downlink control channel common search space set, and
   wherein a duration of the last symbol of the valid PUSCH occasion corresponds to the SCS for the type 1 downlink control channel common search space set.

12. A base station in a wireless communication system, the base station comprising:
   a transceiver; and
   a controller coupled with the transceiver and configured to:
      transmit, via the transceiver, configuration information related to a two-step random access,
      receive, from a terminal, a random access preamble for the two-step random access according to the configuration information, and
      transmit, to the terminal, downlink control information (DCI) scrambled by a message B-radio network temporary identifier (MsgB-RNTI) while a window is running, wherein in case that the random access preamble is mapped to a valid physical uplink shared channel (PUSCH) occasion and a PUSCH associated with the random access preamble is not received, the window starts from a first symbol of an earliest control resource set configured for the terminal after a last symbol of the valid PUSCH occasion.

13. The base station of claim 12, wherein in case that the random access preamble is not mapped to the valid PUSCH occasion, the window starts from the first symbol of the earliest control resource set configured for the terminal after a last symbol of a physical random access channel (PRACH) occasion corresponding to the random access preamble.

14. The base station of claim 12, wherein a length of the window is based on a number of slots according to the configuration information and subcarrier spacing (SCS) for a type 1 downlink control channel common search space set.

15. The base station of claim 14, wherein a duration of the last symbol of the valid PUSCH occasion corresponds to the SCS for the type 1 downlink control channel common search space set.

\* \* \* \* \*